US009392134B2

(12) United States Patent
Morita

(10) Patent No.: US 9,392,134 B2
(45) Date of Patent: Jul. 12, 2016

(54) IMAGE PROCESSING APPARATUS, METHOD OF CONTROLLING THE SAME AND NON-TRANSITORY COMPUTER READABLE RECORDING MEDIUM

(71) Applicant: Konica Minolta, Inc., Tokyo (JP)

(72) Inventor: Mitsutaka Morita, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/807,578

(22) Filed: Jul. 23, 2015

(65) Prior Publication Data

US 2016/0028911 A1 Jan. 28, 2016

(30) Foreign Application Priority Data

Jul. 24, 2014 (JP) .................................. 2014-151064

(51) Int. Cl.
*H04N 1/00* (2006.01)
(52) U.S. Cl.
CPC ............. *H04N 1/00915* (2013.01); *H04N 1/00* (2013.01); *H04N 1/0001* (2013.01); *H04N 1/0023* (2013.01); *H04N 1/00079* (2013.01); *H04N 1/00082* (2013.01); *H04N 1/00127* (2013.01); *H04N 1/00204* (2013.01); *H04N 1/00244* (2013.01); *H04N 1/00307* (2013.01); *H04N 2201/001* (2013.01); *H04N 2201/0013* (2013.01); *H04N 2201/0015* (2013.01); *H04N 2201/0094* (2013.01); *H04N 2201/0096* (2013.01)

(58) Field of Classification Search
USPC ....................................................... 358/1.15
See application file for complete search history.

(56) References Cited

U.S. PATENT DOCUMENTS

| 8,451,488 | B2* | 5/2013 | Kobayashi | G06F 3/1205 358/1.11 |
|---|---|---|---|---|
| 8,582,170 | B2* | 11/2013 | Isshiki | G06F 3/1205 358/1.15 |
| 8,621,110 | B2* | 12/2013 | Okabe | G06F 15/16 358/1.15 |
| 2014/0118766 | A1 | 5/2014 | Kang | |
| 2014/0218775 | A1* | 8/2014 | Grabkowitz | H04N 1/00225 358/474 |

FOREIGN PATENT DOCUMENTS

JP H04-321189 A 11/1992

OTHER PUBLICATIONS

Extended European Search Report issued corresponding European Application No. 15172450.7 dated Jan. 7, 2016 (8 pages).

* cited by examiner

*Primary Examiner* — Allen H Nguyen
(74) *Attorney, Agent, or Firm* — Osha Liang LLP

(57) ABSTRACT

An image processing apparatus, a method of controlling the same and a non-transitory computer readable recording medium are described in which it is possible to disable a particular one of the functions which are implemented using the same communication protocol. A multifunction peripheral (MFP) is capable of communicating with terminal devices. The MFP acquires a capability information request transmitted from the terminal device, returns a capability notification to the terminal device which has transmitted the capability information request, and determines the capabilities which is required by the function that is set to be disabled from among different functions. In this case, the MFP does not notify, as a supported capability, the required capability even if it can be handled by the MFP. Namely, the capability notification is returned such that this capability is not supported.

14 Claims, 7 Drawing Sheets

| func.\cap. | PDF | TIFF | URF | PWG-R aster |
|---|---|---|---|---|
| α | ○ | △ | △ | ○ |
| β | △ | ○ | ○ | △ |
| γ | △ | △ | ○ | △ |

| func.\cap. | PDF | TIFF | URF | PWG-R aster |
|---|---|---|---|---|
| α | ○ | △ | △ | ○ |
| β | ○ | △ | △ | ○ |
| γ | ○ | △ | △ | △ |

| func.\cap. | PDF | TIFF | URF | PWG-R aster |
|---|---|---|---|---|
| α | ○ | △ | △ | ○ |
| β | △ | △ | △ | △ |
| γ | ○ | △ | △ | △ |

IMAGE PROCESSING APPARATUS, METHOD OF CONTROLLING THE SAME AND NON-TRANSITORY COMPUTER READABLE RECORDING MEDIUM

CROSS-REFERENCE TO RELATED APPLICATIONS

The present application claims priority under 35 U.S.C. §119 to Japanese Patent Application No. P2014-151064, filed Jul. 24, 2014. The contents of this application are herein incorporated by reference in their entirety.

FIELD OF THE INVENTION

One or more embodiments of the invention relate to an image processing apparatus, a method of controlling the same and a non-transitory computer readable recording medium.

BACKGROUND

In recent years, attention is paid to printing systems using terminal devices that communicate directly with printers (image forming apparatuses) to perform print operation by the printers. The terminal device of this print system automatically searches for compatible printers which are connected to the same network as the terminal device so that print operation can be performed without need for installing driver software in the terminal device. For example, AirPrint developed by Apple Inc. and Google Cloud Print developed by Google Inc. provide environment to configure terminal devices to implement the above-mentioned printing systems.

In this type of printing systems, the terminal devices and the printers make use of a standard network protocol (telecommunication rule or communication procedure) such as Bonjour. The terminal device discovers appropriate printers by multicasting an inquiry to printers on the same network and requiring each printer to return information about capabilities (file formats) which can be handled by the each printer. When each printer returns a capability notification in response to this inquiry, the terminal device determines if the printer has the capability for the required purpose of the terminal device, and reflects the capability notification in the search result to be displayed. The user refers to this search result and select one printer to perform printing. In accordance with this method, it is possible to discover printers not only of a particular printer manufacturer but also of a variety of printer manufacturers.

Incidentally, for example, Japanese Patent Published Application No. H4-321189 discloses a portable electronic apparatus supporting different types of communication protocols. This apparatus is provided with a storing mechanism for storing a plurality of communication protocols, and an enable mechanism for enabling a predetermined communication protocol from among the plurality of communication protocols stored in the storing mechanism. The portable electronic apparatus communicates with an external device by the use of the communication protocol which is enabled by this enable mechanism.

Incidentally, while the printing system as described above provides an environment where printing is made possible for terminal devices in which are implemented various functions (AirPrint, Google Cloud Print or the like), sometimes on the printer side a certain function (a function of a terminal device) is disabled. For example, there are needs for having a terminal device recognize the printer as a printer compatible with a certain function but recognize the printer as a printer incompatible with another function.

However, since these functions implemented in terminal devices uses the same communication protocol, the printing system cannot determine which function transmits a capability inquiry so that it is impossible to enable/disable each of the functions independently.

In view of the above, one or more embodiments of the invention may provide an image processing apparatus, a method of controlling the same and a non-transitory computer readable recording medium which can disable a particular one of functions which are implemented using the same communication protocol.

SUMMARY OF THE INVENTION

In accordance with one or more embodiments of the invention, an image processing apparatus may comprise: a communication interface unit configured to communicate with a terminal device having a function to transmit print data; and a printer controller having one or more capabilities to process the print data. The printer controller comprises: an acquisition unit configured to acquire a capability information request transmitted from the terminal device; a notification unit configured to return a capability notification to the terminal device having transmitted the capability information request to notify a capability which can be handled by the printer controller; and a determination unit configured to determine a capability required by a particular function which is one of a plurality of different functions and set to be disabled, wherein, even when the capability determined by the determination unit can be handled by the printer controller, the notification unit returns the capability notification that the determined capability is not supported.

In one or more embodiments of the invention, the image processing apparatus further comprises a storing unit configured to store each of the plurality of different functions and a capability required by the each different function in association with each other. In this case, the determination unit determines the required capability with reference to the storing unit.

Also, when there are a plurality of capabilities required by the particular function, the determination unit determines one of the required capabilities.

Furthermore, when every capability of the plurality of capabilities required by the particular function is not required by any other of the plurality of different functions, the determination unit determines one of the plurality of capabilities required by the particular function.

Still further, when only one of the plurality of capabilities required by the particular function is required by the different functions other than the particular function, the determination unit determines one of the required capabilities other than the capabilities required by the other different functions.

Still further, when there are a plurality of capabilities which are required by the particular function and required by the different functions other than the particular function, one of the required capabilities which is required by the least number of the other different functions is determined.

Still further, the determination unit sets a particular function based on information input by a user. Still further, the determination unit automatically sets a particular function.

Still further, the capabilities correspond to file formats respectively.

Still further, the notification unit returns the capability notification that, of the capabilities which can be handled by the printer controller, the capabilities other than at least the required capability, which is determined by the determination unit, are notified as supported capabilities.

Still further, the notification unit returns the capability notification that at least the required capability, which is determined by the determination unit, are notified as non-supported capabilities.

BRIEF DESCRIPTION OF THE DRAWINGS

FIG. 3 is an explanatory view for showing one example of a reference table stored in the MFP in accordance with one or more embodiments of the invention.

FIG. 4 is an explanatory view for showing another example of a reference table stored in the MFP in accordance with one or more embodiments of the invention.

FIG. 5 is an explanatory view for showing a further example of a reference table stored in the MFP in accordance with one or more embodiments of the invention.

DETAILED DESCRIPTION OF EMBODIMENTS

Figure 1:
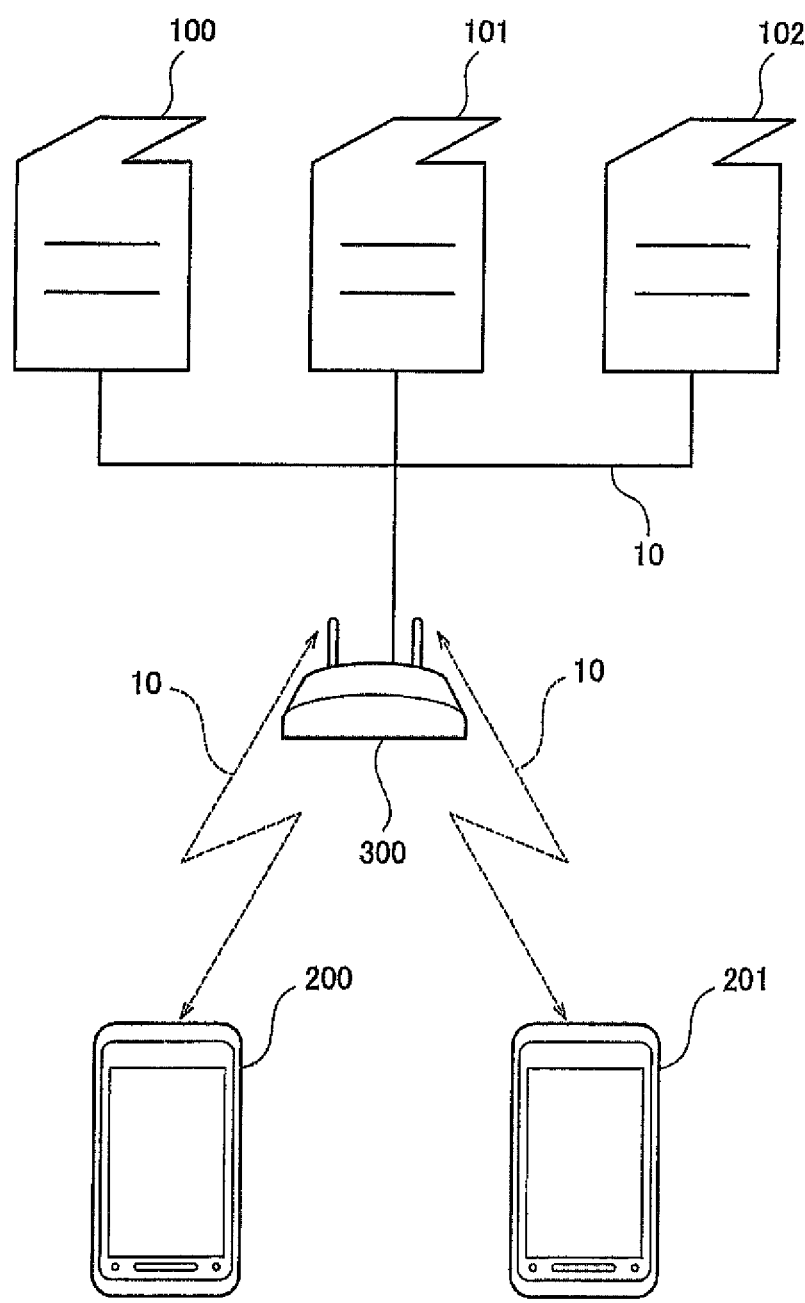
FIG. 1 is an explanatory view for showing the overall configuration of a print system in accordance with one or more embodiments of the present invention.

FIG. 1 is an explanatory view for schematically showing the overall configuration of a printing system in accordance with one or more embodiments of the invention. The printing system includes one or more MultiFunction Peripherals (MFPs) as image forming apparatuses and one or more terminal devices. FIG. 1 shows three MFPs 100, 101 and 102 and two terminal devices 200 and 201. The three MFPs 100, 101 and 102 and two terminal devices 200 and 201 are connected to the same network 10 and configured to communicate with each other.

The network 10 is, for example, a local area network (LAN). Each of the MFPs 100, 101 and 102 are connected to the network 10 through a so-called wired LAN. On the other hand, the terminal devices 200 and 201 are connected to the network 10 through a so-called wireless LAN. A relay device 300 is connected to the network 10 as a wireless LAN access point so that the terminal devices 200 and 201 can be connected through the relay device 300 to the network 10 by wireless connecting with the relay device 300.

Each of the MFPs 100, 101 and 102 is provided with an original reading function to read originals, an image formation function to form images on sheets based on image data, and so forth. The MFPs 100, 101 and 102 have the same configuration so that, unless specifically mentioned, the MFP 100 is explained here as an example.

Figure 2:
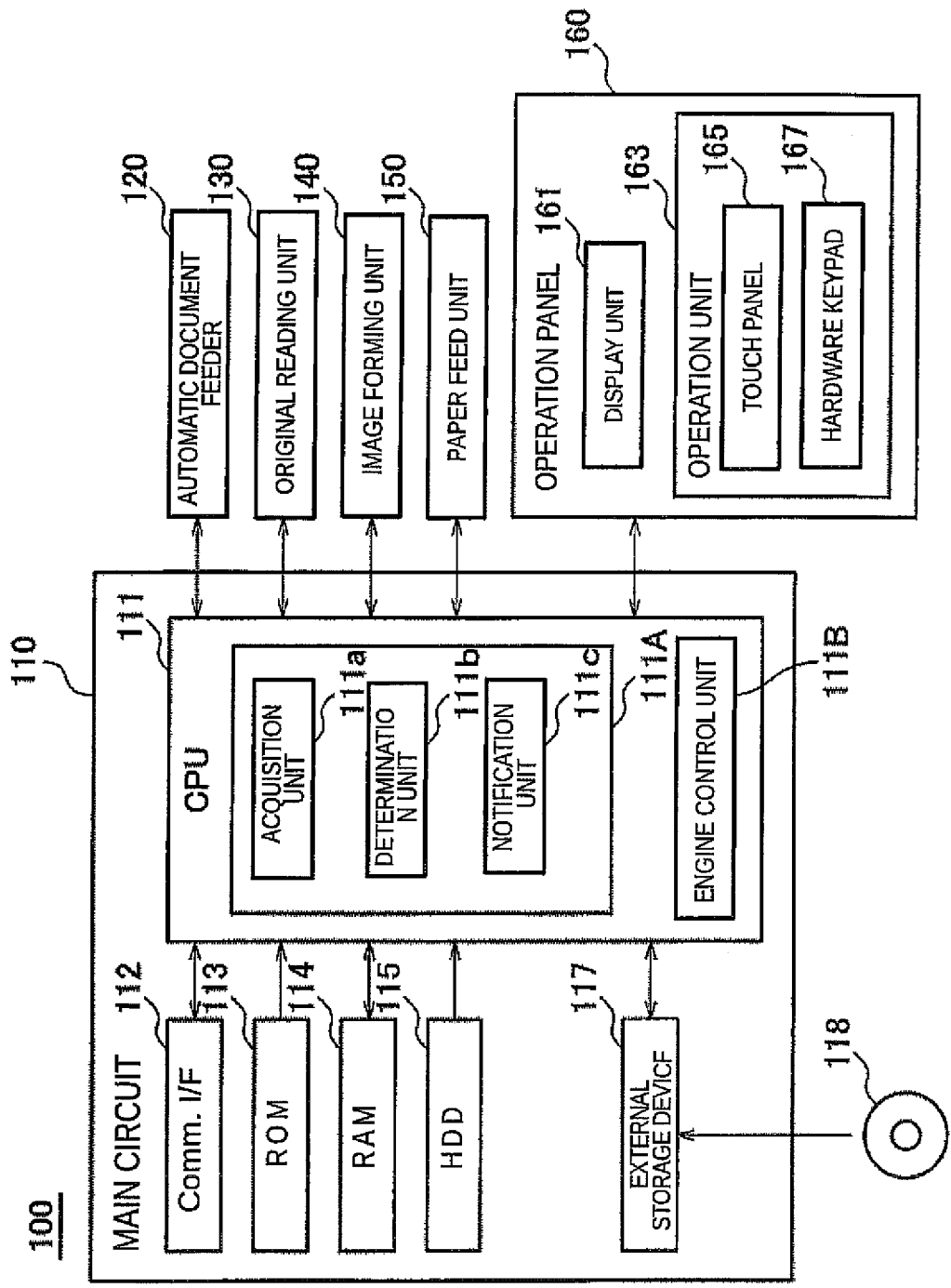
FIG. 2 is a block diagram for showing the configuration of a MultiFunction Peripheral (MFP) shown in FIG. 1 in accordance with one or more embodiments of the invention.

FIG. 2 is a block diagram for showing the configuration of the MFP 100. The MFP 100 includes a main circuit 110, an automatic document feeder 120, an original reading unit 130, an image forming unit 140, a paper feed unit 150 and an operation panel 160. The automatic document feeder 120 conveys originals to the original reading unit 130. The original reading unit 130 reads the conveyed originals and outputs image data. The image forming unit 140 forms images on sheets based on the image data. The paper feed unit 150 supplies the image forming unit 140 with sheets.

The operation panel 160 is located on the top of the MFP 100 and provided with a display unit 161 and an operation unit 163. The display unit 161 is a liquid crystal display device (LCD), an organic ELD (Electro-Luminescence Display), or the like display device which can display an instruction menu, information about image data and so forth. The operation unit 163 is provided with a plurality of keys (hardware keypad 167) operated by users to input a variety of instructions, characters, numerals and so forth. Also, the operation unit 163 is provided further with a touch panel 165 on the top of the display unit 161.

The main circuit 110 includes a CPU 111, a communication interface (I/F) 112, a ROM 113, a RAM 114, a hard disk drive (HDD) 115 and an external storage device 117.

The CPU 111 is connected to the automatic document feeder 120, the original reading unit 130, the image forming unit 140, the paper feed unit 150 and the operation panel 160 to control the entirety of the MFP 100.

The communication I/F 112 is an interface through which the MFP 100 is connected to the network 10. The CPU 111 can communicate with the MFPs 101 and 102 and the terminal devices 200 and 201 through the communication I/F 112. This data communication is performed by the use of an arbitrary protocol such as Bonjour. Also, the communication I/F 112 can be used to communicate with a computer (not shown in the figure) which is connected to the Internet through the network 10.

The ROM 113 stores a program to be run by the CPU 111 and necessary data required for running the program. The RAM 114 provides a work area on which the CPU 111 runs the program. Also, the RAM 114 is used to temporarily store image data output from the original reading unit 130.

The external storage device 117 receives a CD-ROM 118. The CPU 111 can access the CD-ROM 118 by means of the external storage device 117. The CPU 111 loads and runs a program, which is stored in the CD-ROM 118, on the RAM 114.

Incidentally, the program to be run by the CPU 111 may be stored not only in the CD-ROM 118 but also in an optical disk such as an MO (Magnetic Optical Disc, MD (MiniDisc), DVD (Digital Versatile Disc), an IC card, an optical card, or a semiconductor memory such as a mask ROM, an EPROM (Erasable Programmable ROM), as an EE PROM (Electrically EPROM).

Also, the CPU 111 can not only run a program stored in the CD-ROM 118, but also run a program stored in the HDD 115 as a mass storage device by loading the program onto the RAM 114. In this case, a computer connected to the network 10 can rewrite the program stored in the HDD 115 of the MFP 100 or add a new program to the HDD 115. Furthermore, the MFP 100 can be configured to download a program from a computer connected to the network 10 and store the program in the HDD 115. Such programs includes not only programs which can be directly run by the CPU 111 but also programs in the forms of source programs, compressed programs, encoded programs and so forth.

As seen from a functional view point in relation to FIG. 2, the CPU 111 serves as a printer controller 111A and an engine control unit 111B.

The printer controller 111A converts print data transmitted from the terminal devices 200 and 201 to image data (raster data) and outputs the image data to the engine control unit 111B. The printer controller 111A has one or more capabilities for processing print data. In this case, the capability is an ability to process a file format such as PDF, PWG-Raster, TIFF or URF, and the terminal devices 200 and 201 have functions (such as AirPrint, Google Cloud Print) to transmit print data compliant with predetermined capabilities.

As seen from a functional view point in relation to FIG. 2, the printer controller 111A serves as an acquisition unit 111a, a determination unit 111b and a notification unit 111c.

The acquisition unit 111a acquires a capability information request transmitted from the terminal device 200 or 201. The determination unit 111b determines the capabilities (required capabilities) which is indispensable for the function that is disabled as described below. The notification unit 111c returns a capability notification to inform the terminal device 200 or 201, which has transmitted the capability information request, of the capabilities which are supported by the printer controller 111A.

The notification unit 111c usually returns a capability notification that all the capabilities which can be handled by the printer controller 111A are supported. However, in one or more embodiments of the invention, the notification unit 111c does not notify, as a supported capability, the required capability which is determined by the determination unit 111b even if it can be handled (supported) by the printer controller 111A. Namely, the notification unit 111c returns a capability notification that this capability is not supported.

The engine control unit 111B controls the automatic document feeder 120, the original reading unit 130, the image forming unit 140, the paper feed unit 150 and the operation panel 160 respectively in order to form images based on image data.

FIGS. 3 through 5 are explanatory views for showing examples of the reference table 116 stored in the MFP 100. In one or more embodiments of the invention, the reference table 116 is stored in the HDD 115 of the MFP 100. The CPU 111 refers to this reference table 116. The reference table 116 is a table for storing a plurality of functions each of which is associated with the required capabilities thereof. FIGS. 3 through 5 show three patterns of reference tables 116a, 116b and 116c respectively.

In the reference tables 116a, 116b and 116c shown in FIGS. 3 through 5, "○" indicates a required capability, and "Δ" indicates a selectable capability (optional capability) other than the required capability. For example, in the reference table 116a of FIG. 3, a function a designates PDF and PWG-Raster as required capabilities, and TIFF and URF as optional capabilities. In other words, with respect to the function α, only MFPs supporting the required capabilities, i.e, PDF and PWG-Raster, are compatible printers.

Referring again to FIG. 1, the terminal devices 200 and 201 are, for example, cellular phones or smartphones which can be used for telephone conversation by wirelessly communicating with a cellular phone base station (not shown in the figure) and connecting a mobile communication network. The terminal device 200 is provided with a wireless LAN function. Incidentally, the terminal device 200 is not necessarily required to have a telephone conversation function, but only required to have a function to connect with the network 10 so that, for example, a PDA (Personal Digital Assistants) can be used in place of the terminal device 200. The terminal devices 200 and 201 have the same configuration so that, unless specifically mentioned, the terminal device 200 is explained here as an example.

Figure 6:
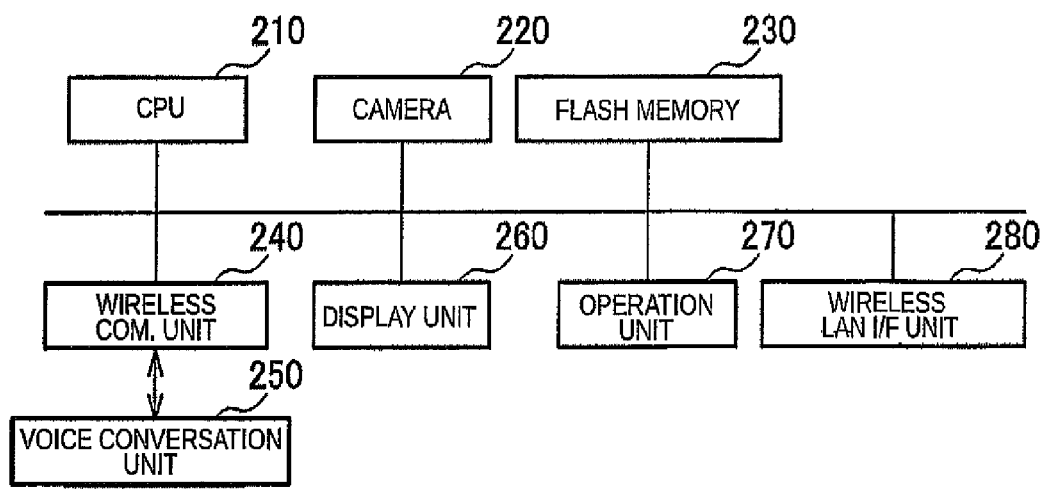
FIG. 6 is a block diagram for showing the configuration of a terminal device in accordance with one or more embodiments of the invention.

FIG. 6 is a block diagram for showing the configuration of the terminal device 200. The terminal device 200 is provided with a CPU 210, a camera 220, a flash memory 230, a wireless communication unit 240, a display unit 260, an operation unit 270 and a wireless LAN I/F unit 280.

The CPU 210 generally controls the terminal device 200.

The camera 220 is provided with a lens unit and a photoelectric conversion device to focus light on the photoelectric conversion device through the lens unit, and photoelectrically convert the focused light by the photoelectric conversion device to image data which is output to the CPU 210. The photoelectric conversion device is a CMOS (Complementary Metal Oxide Semiconductor) sensor, a CCD (Charge Coupled Device) sensor or the like.

The flash memory 230 can store data in a non-volatile manner. The flash memory 230 stores a program which is run by the CPU 210, and necessary data required for running this program. The CPU 210 loads the program stored in the flash memory 230 onto the RAM accompanying the CPU 210.

Incidentally, the CPU 210 may run a program which is stored in the flash memory 230 and rewritten by an external computer connected to the network 10, and/or a new program additionally loaded onto the flash memory 230 by an external computer. Furthermore, the program may be a program which is downloaded by the terminal device 200 from an external computer connected to the network 10. These programs include not only a program which can be directly run by the CPU 210 but also a program in the form of a source program, a compressed program, an encoded program or the like.

Incidentally, the program to be run by the CPU 210 may be stored not only in the flash memory 230 but also in an optical disk such as an MO (Magnetic Optical Disc, MD (MiniDisc), DVD (Digital Versatile Disc), an IC card, an optical card, or a semiconductor memory such as a mask ROM, an EPROM (Erasable Programmable ROM), as an EEPROM (Electrically EPROM).

The wireless communication unit 240 wirelessly communicates with a mobile communication network which is connected to perform a telephone communication network. The wireless communication unit 240 connects the terminal device 200 with the telephone communication network to make it possible to telephone conversation through a voice conversation unit 250. The wireless communication unit 240 decodes audio signals obtained by demodulating radio frequency signals received from a cellular phone base station, and outputs the decoded voice signals to the voice conversation unit 250. Also, the wireless communication unit 240 encodes audio signal input from the voice conversation unit 250 and transmits the encoded audio signal to the cellular phone base station by modulating the encoded audio signal. The voice conversation unit 250 is provided with a microphone and a speaker which are not shown in the figure, and configured to output sound, which is input from the wireless communication unit 240, to the speaker and transfer audio signals, which is input from the microphone, to the wireless communication unit 240. In addition to this, the wireless communication unit 240 is controlled by the CPU 210 to connect the terminal device 200 with an electronic mail server for transmitting and receiving email.

The display unit 260 is a display device such as a liquid crystal display device (LCD), an organic ELD or the like device for displaying, for example, an instruction menu and information about the image data as received.

The operation unit 270 is used to accept user's operation. The operation unit 270 includes a touch panel provided on the display unit 260 or a plurality of keys to receive various instructions, letters, numerals or other data in response to user's operation.

The wireless LAN I/F unit 280 is an interface for communicating with the relay device 300 to connect the terminal device 200 with the network 10. The terminal device 200 can communicate with the MFPs 100, 101 and 102.

In one or more embodiments of the invention, while the terminal device 200 communicates with the MFPs 100, 101 and 102 through the wireless LAN I/F unit 280, any other appropriate communication technique can be employed for the same purpose. For example, when the terminal device 200 and the MFPs 100, 101 and 102 incorporate short range wireless communication functionality such as Bluetooth or NFC respectively, the terminal device 200 can directly communicate with either one of the MFPs 100, 101 and 102 through a point-to-point connection. Alternatively, the terminal device 200 may be wired connected to some of the MFPs 100, 101 and 102 through a USB (Universal Serial Bus) cable or the like, and wireless connected to some of the MFPs 100, 101 and 102 through a point-to-point connection.

As seen from a functional view point in relation to FIG. 2, the terminal device 200 has a function (such as AirPrint, Google Cloud Print) to transmit print data compliant with predetermined capabilities. The function incorporated in the terminal device 200 supports capabilities (required capability) which is indispensable for the function and selectable capabilities (optional capability) other than the required capabilities. Because of this, among the MFPs 100, 101 and 102, only printer(s) incorporating the required capabilities of a function are compatible printer(s).

These functions implemented in the terminal devices 200 and 201 use the same communication protocol. This data communication can be performed by the use of an arbitrary protocol such as Bonjour.

Figure 7:
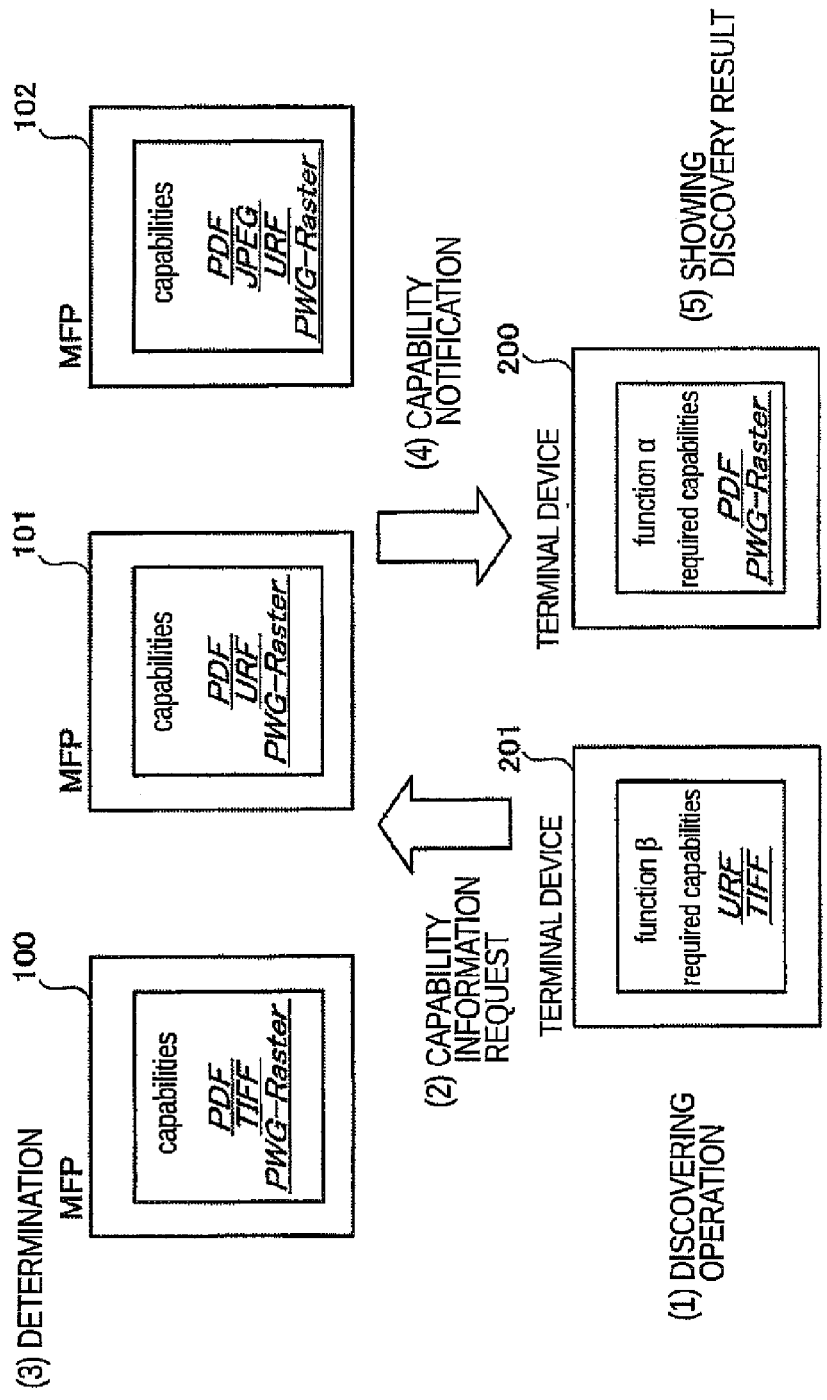
FIG. 7 is a schematic representation for explaining the operation of the print system shown in FIG. 1 in accordance with one or more embodiments of the invention.

FIG. 7 is a schematic representation for explaining the operation of the print system. The following is the explanation of the operations of the MFPs 100, 101 and 102 and terminal devices 200 and 201 in the print system in accordance with one or more embodiments of the invention.

In this example, the MFP 100 has, for example, the three capabilities (to handle three file formats) of PDF, TIFF and PWG-Raster, and the MFP 101 has, for example, the three capabilities of PDF, URF and PWG-Raster. Also, the MFP 102 has, for example, the four capabilities of PDF, PEG URF and PWG-Raster.

On the other hand, the terminal device 200 and the terminal device 201 incorporate different types of functions α and β respectively. The function α of the terminal device 200 supports PDF and PWG-Raster as its required capabilities, and only MFPs supporting all the required capabilities are compatible printers. In the case shown in FIG. 7, the capabilities of the MFP 100 include both PDF and PWG-Raster and therefore can be a compatible printer of the function α. The MFPs 101 and 102 can be compatible printers for the same reason. On the other hand, the function β of the terminal device 201 supports URF and TIFF as its required capabilities, and only MFPs supporting all the required capabilities are compatible printers. In the case shown in FIG. 7, the capabilities of the MFP 100 do not include both URF and TIFF and therefore cannot be a compatible printer of the function β. The MFPs 101 and 102 cannot be compatible printers for the same reason. Meanwhile, for the sake of clarity in explanation, the required capabilities of the functions α and β shown in FIG. 7 correspond respectively to those shown in FIG. 3. However, the required capabilities of the functions α and β may correspond respectively to those shown in FIG. 4 or 5 or any other combination.

Incidentally, unless specifically mentioned, the MFP 100 is described here as an example for explaining the operation of each MFP. The operation of the MFP 100 is implemented by a program which is stored in the ROM 113 and run by the CPU 111. On the other hand, with respect to the following explanation of the terminal device, the operation of the terminal device 200 is explained as an example unless specifically mentioned. The operation of the terminal device 200 is implemented by a program which is stored in the flash memory 230 and run by the CPU 210.

First, when the user of the terminal device 200 performs a printer discovery operation for the purpose of printing certain documents, images or the like, a corresponding operation signal is input to the CPU 210. The CPU 210 searches the network 10 for discovering compatible printers. Specifically, the CPU 210 transmits a capability information request through the wireless LAN I/F unit 280. The capability information request is transmitted as a multicast message to the MFPs 100, 101 and 102 through the relay device 300.

When receiving the capability information request through the communication I/F 112, the CPU 111 of the MFP 100 performs a determination process for disabled function(s). The disabled function(s) are function(s) to be disabled, from among different functions, as particular function(s) with which the MFP 100 is not to be a compatible printer.

The setting of disabled function(s) can be done, for example, by the user (administrator) of the MFP 100 through the operation panel 160 to disable particular function(s). However, the setting of disabled function(s) may automatically be performed by the CPU 111. For example, in view of security vulnerability, the CPU 111 may set a particular function to be disabled based on information accumulated on a predetermined server on the Internet. Of course, it is possible not to disable a particular function by enabling all the functions of the MFP 100. In one or more embodiments of the invention, it is assumed that the "function α" is set as a disabled function in the MFP 100.

Figure 8:
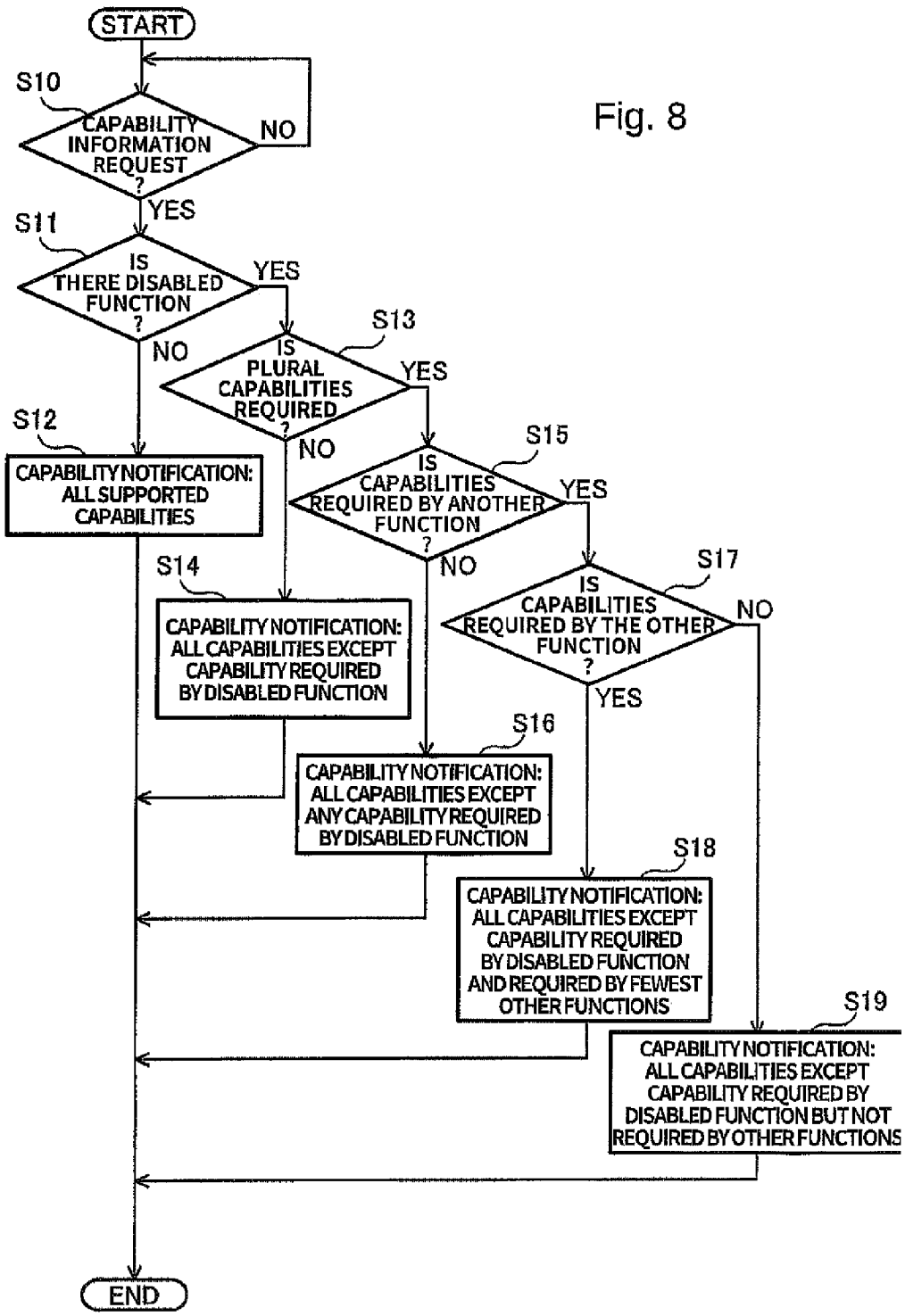
FIG. 8 is a flow chart for showing a determination process in accordance with one or more embodiments of the invention.

FIG. 8 is a flow chart for showing the determination process in detail. First, in step S10, the CPU 111 determines whether or not there is a capability information request. When the CPU 111 receives a capability information request, the determination in step S10 is in the affirmative so that the process proceeds to step S11. Conversely, if the CPU 111 does not receive a capability information request yet, the determination in step S10 is in the negative so that the process is returned to step S10 again.

In step S11, the CPU 111 determines whether or not there is a disabled function. If there is a disabled function, the determination in step S11 is in the affirmative so that the process proceeds to step S13 to be described below. Conversely, if there is no disabled function, the determination in step S11 is in the negative so that the process proceeds to step S12.

In step S12, the CPU 111 notifies the terminal device 200 that the MFP 100 supports capabilities (for example, PDF, TIFF, PWG-Raster) are implemented in and supported by the MFP 100. After returning this capability notification, this routine is finished (END).

In step S13, with reference to the reference table 116, the CPU 111 determines whether or not there are a plurality of capabilities required by the disabled function α. For example, in the case of the reference tables 116 shown in FIG. 3 through FIG. 5, the function α supports two capabilities, i.e., PDF and PWG-Raster as required capabilities. In this case, the determination in step S13 is in the affirmative so that the process proceeds to step S15 to be described below. Conversely, if the function α supports only a single required capability, the determination in step S13 is in the negative so that the process proceeds to step S14.

In step S14, the CPU 111 does not notify the single required capability of the function α as a supported capability. The CPU 111 thereby returns a capability notification that the single required capability is not supported. Specifically, the CPU 111 returns a capability notification that, of the capabilities which can be handled by the MFP 100, only the capabilities other than the non-supported capability (the required capability of the function α) are notified as supported capabilities. After returning this capability notification, this routine is finished (END).

In step S15, with reference to the reference table 116, the CPU 111 determines whether or not, of the required capabilities of the disabled function α, there is a capability which is required also by another function β or γ. For example, in the case of the reference table 116a shown in FIG. 3, while the required capabilities of the function β are TIFF and URF, and the required capability of the function γ is URF, the required capabilities of the disabled function α are PDF and PWG-Raster which are not the required capabilities of the other functions β and γ. In this case, the determination in step S15 is in the negative so that the process proceeds to step S16.

In step S16, the CPU 111 determines one of a plurality of the required capabilities of the disabled function α. For example, in the case of the example shown in FIG. 3 in which the function α supports two capabilities, i.e., PDF and PWG-Raster as required capabilities, the CPU 111 determines either PDF or PWG-Raster. The CPU 111 does not notify the required capability, which is determined, as a supported capability. Namely, the CPU 111 returns a capability notification that the determined capability is not supported. Specifically, the CPU 111 returns a capability notification that, of the capabilities which can be handled by the MFP 100, only the capabilities other than the required capability, which is determined, are notified as supported capabilities. After returning this capability notification, this routine is finished (END).

On the other hand, for example, in the case of the reference table 116b shown in FIG. 4, PDF which is one of the required capabilities of the function α is also one of the required capabilities of the function β. Also, for example, in the case of the reference table 116c shown in FIG. 5, PDF which is one of the required capabilities of the function α is also one of the required capabilities of the function γ. In this case, the determination in step S15 is in the affirmative so that the process proceeds to step S17.

In step S17, with reference to the reference table 116, the CPU 111 determines whether or not, of the required capabilities of the disabled function α, the remaining required capability PWG-Raster is also required by either the function β or the function γ. For example, in the case of the reference table 116b shown in FIG. 4, the required capabilities of the function β are PDF and PWG-Raster so that the other required capability of the function α, i.e., PWG-Raster is also required by the function β. In this case, the determination in step S17 is in the affirmative so that the process proceeds to step S18. On the other hand, for example, in the case of the reference table 116c shown in FIG. 5, the function γ requires only PDF but does not require PWG-Raster which is the other required capability of the disabled function α. In this case, the determination in step S17 is in the negative so that the process proceeds to step S19.

In step S18, the CPU 111 determines one of the required capabilities which is required by the least number of the other functions β and γ. For example, in the case of the reference table 116b shown in FIG. 4, PDF which is one of the required capabilities of the function α is also required by the functions β and γ. On the other hand, PWG-Raster which is the other required capability of the disabled function α is required only by the function β. In this case, the CPU 111 determines PWG-Raster which is not required by both the other functions β and γ, but only required by the function γ. The CPU 111 does thereby not notify the determined capability as a supported capability. Namely, a capability notification that the single required capability is returned such that the determined capability is not supported. Specifically, the CPU 111 returns a capability notification that, of the capabilities which can be handled by the MFP 100, only the capabilities other than the required capability, which is determined, are notified as supported capabilities. After returning this capability notification, this routine is finished (END).

In step S19, the CPU 111 determines one of the required capabilities which is not required by the other functions β and γ. For example, in the case of the reference table 116c shown in FIG. 5, the CPU 111 determines PWG-Raster which is one of the required capabilities of the function α but not required by the function γ. The CPU 111 does not notify the required capability, which is determined, as a supported capability. Namely, the CPU 111 returns a capability notification that the determined capability is not supported. Specifically, the CPU 111 returns a capability notification that, of the capabilities which can be handled by the MFP 100, only the capabilities other than the required capability, which is determined, are notified as supported capabilities. After returning this capability notification, this routine is finished (END).

Figure 9:
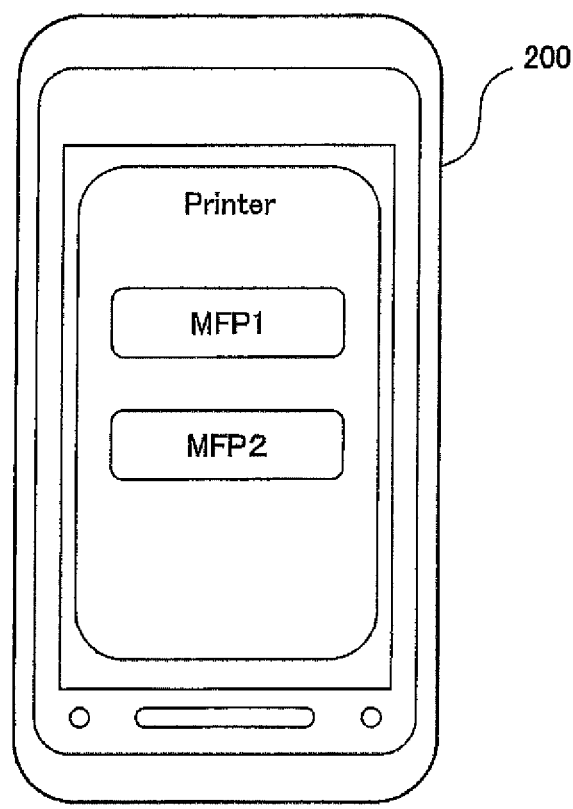
FIG. 9 is an explanatory view for showing an example of a discovery result in accordance with one or more embodiments of the invention.

Referring again to FIG. 7, when receiving capability notifications through the wireless LAN I/F unit 280, the CPU 210 of the terminal device 200 compares own required capabilities with the capability notifications transmitted from the MFPs 100, 101 and 102. The CPU 210 recognizes, of the MFPs 100, 101 and 102 having transmitted capability notifications, the MFP having notified to support all the required capabilities of the own function α as a compatible printer. As shown in FIG. 9, the CPU 210 shows the MFP(s) recognized as compatible printer(s) in a discovery result.

In one or more embodiments of the invention described above, the MFP 100 serving as an image forming apparatus is provided with the communication FP 112 for communicating with the terminal devices 200 and 201 which incorporate the function to transmit print data, and the printer controller 111A (CPU 111) for handling one or more capabilities to process print data. On the other hand, the printer controller 111A is provided with the acquisition unit 111a which acquires a capability information request transmitted from the terminal device 200 or 201, the notification unit 111c which returns a capability notification to the terminal device 200 or 201, which has transmitted the capability information request, and the determination unit 111b which determines the capabilities (required capabilities) which is indispensable for the function that is set to be disabled from among different functions. In this case, the notification unit 111c returns a capability notification that the required capability determined by the determination unit 111b is not supported even if it can be handled by the printer controller 111A.

In accordance with this configuration, the notification unit 111c returns a capability notification that the required capability of a function to be disabled is not supported even if it can be handled by the printer controller 111A. Because of this, even when a capability notification is returned by either one of the MFPs 100, 101 and 102 supporting the required capabilities of a function, this MFP is not recognized as a compatible printer if the function is set to be disabled. It is therefore possible to disable a particular one of the functions which are implemented using the same communication protocol.

In one or more embodiments of the invention, the MFP 100 is provided further with the HDD 115 (storing unit) in which a plurality of different functions are stored in association with the required capabilities thereof respectively. The determination unit 111b determines the required capabilities of each function with reference to the HDD 115.

In accordance with this configuration, the MFP 100 stores the information about the correspondence between the functions and the required capabilities, and can therefore appropriately determine the required capabilities of a function to be disabled.

In one or more embodiments of the invention, the reference table 116 is stored in the HDD 115. However, the MFP 100 has not to store the reference table 116 therein but can determine the required capabilities with reference to information stored in an external device.

In one or more embodiments of the invention, when there are a plurality of required capabilities of the disabled function α, the determination unit 111b determines only one of the required capabilities.

Particularly, when every capability required of the disabled function α is not required by each of the other types of functions β and γ, one of the required capabilities of the disabled function α is determined.

In this case, since either of the other types of functions β and γ is not disabled irrespective of which required capability is determined, the determined capability can be arbitrarily selected.

Also, when only one of the required capabilities of the disabled function α is required by either of the other types of the functions β and γ, one of the required capabilities other than the capabilities required by the other types of the functions β and γ is determined.

In this case, even if the functions have a common required capability, the common required capability is only one so that the determined capability can be selected except this common required capability. It is therefore possible to disable only the function α without disabling the other types of the functions β and γ.

On the other hand, when there are a plurality of capabilities which are required by the disabled function α and also required by the other types of the functions β and γ, one of the required capabilities which is required by the least number of the other functions β and γ is determined.

When different functions requires the same capabilities, even if it is to disable only one function, other function(s) may be involved to be disabled. Because of this, when different functions requires the same capabilities, the capability which is required by the least number of the other functions β and γ is selected in order to minimize the number of functions which are unintentionally disabled.

In one or more embodiments of the invention, the determination unit 111b sets a disabled function based on information input by a user.

hi accordance with this configuration, a user can designate a function to be disabled by operation. Alternatively, as has been discussed above, the determination unit 111b can automatically set a particular function as a disabled function.

In one or more embodiments of the invention, the notification unit 111c does not notify, as a supported capability, the required capability which is determined by the determination unit 111b even if it can be handled by the printer controller 111A. Namely, the notification unit 111c returns a capability notification that the required capability determined by the determination unit 111b is not supported even if it can be handled by the printer controller 111A.

Such a capability notification is implemented in order to notify capabilities which can be supported. Namely, the notification unit 111c returns a capability notification that, of the capabilities which can be handled by the printer controller 111A, only the capabilities other than the required capability, which is determined by the determination unit 111b, are notified as supported capabilities. By this configuration, the terminal devices 200 and 201 can easily be informed of the supported capabilities of the MFP 100 with reference to the capability notification. The terminal devices 200 and 201 can thereby easily discover an MFP which is a compatible printer.

The notification can be performed not only by notifying supported capabilities but also by notifying non-supported capabilities. In other words, the notification unit 111c can notify the required capabilities determined by the determination unit 111b as non-supported capabilities. The terminal devices 200 and 201 can thereby indirectly know supported capabilities which are not notified as non-supported capabilities with reference to the capability notification.

Furthermore, the notification unit 111c is required at least not to notify, as a supported capability, the required capability determined by the determination unit 111b, i.e., one of the required capabilities of the function to be disabled. Accordingly, the notification unit 111c need not notify all the capabilities supported by the printer controller 111A except the required capabilities determined by the determination unit 111b, For example, it is possible not to notify at least one capability (for example, one of the optional capabilities) other than the required capabilities determined by the determination unit 111b.

In accordance with the present invention, the required capability of a particular function which is set to be disabled is not notified, as a supported capability, even if it can be handled by the printer controller. Namely, a capability notification is returned to notify that this capability is not supported. Because of this, with respect to a particular function which is set to be disabled, it is recognized that the required capability is not supported. It is therefore possible to disable a particular one of the functions which are implemented using the same communication protocol.

The foregoing description has been presented based on the print system and the image forming apparatus of this print system according to the present invention. However, it is not intended to limit the present invention to the precise form described, and obviously many modifications and variations are possible within the scope of the invention.

For example, embodiments of the invention have been explained with reference to the image processing apparatus which generates image data by processing print data, and the image forming apparatus equipped integrally with a print engine which forms images based on this image data. However, the image processing apparatus and the print engine can be implemented as separate units respectively such that the control system of the image processing apparatus may function as the above printer controller. In other words, embodiments of the invention can be considered to relate not only to the image forming system, but also to the image processing apparatus which is provided separate from the print engine. Furthermore, embodiments of the invention can be considered to relate the control method of this image processing apparatus, a computer program for causing a computer to execute the process as described above, and computer readable medium on which this computer program is recorded.

In the above disclosure, the words "a" or "an" are to be taken to include both the singular and the plural. Conversely, any reference to plural items shall, where appropriate, include the singular. Also, as used herein, the term "include" and its grammatical variants are intended to be non-limiting, such that recitation of items in a list is not to the exclusion of other like items that can be substituted or added to the listed items.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus comprising:
   a communication interface unit that communicates with a terminal device having a function to transmit print data; and
   a printer controller having one or more capabilities to process the print data,
   the printer controller comprising:
   an acquisition unit that acquires a capability information request transmitted from the terminal device;
   a notification unit that returns a capability notification to the terminal device having transmitted the capability information request to notify a capability which can be handled by the printer controller; and
   a determination unit that determines a capability required by a particular function that is one of a plurality of different functions and set to be disabled,
   wherein, even when the capability determined by the determination unit can be handled by the printer controller, the notification unit returns the capability notification that the determined capability is not supported.

2. The image processing apparatus of claim 1 further comprising:
   a storing unit that stores each of the plurality of different functions and a capability required by the each different function in association with each other,
   wherein the determination unit determines the required capability with reference to the storing unit.

3. The image processing apparatus of claim 1, wherein when there are a plurality of capabilities required by the particular function, the determination unit determines one of the required capabilities.

4. The image processing apparatus of claim 3, wherein when every capability of the plurality of capabilities required by the particular function is not required by any other of the plurality of different functions, the determination unit determines one of the plurality of capabilities required by the particular function.

5. The image processing apparatus of claim 3, wherein when only one of the plurality of capabilities required by the particular function is required by the different functions other than the particular function, the determination unit determines one of the required capabilities other than the capabilities required by the other different functions.

6. The image processing apparatus of claim 3, wherein when there are a plurality of capabilities which are required by the particular function and required by the different functions other than the particular function, one of the required capabilities which is required by the least number of the other different functions is determined.

7. The image processing apparatus of claim 1, wherein the determination unit sets a particular function based on information input by a user.

8. The image processing apparatus of claim 1, wherein the determination unit automatically sets a particular function.

9. The image processing apparatus of claim 1, wherein the capabilities correspond to file formats respectively.

10. The image processing apparatus of claim 1, wherein the notification unit returns the capability notification that, of the capabilities which can be handled by the printer controller, the capabilities other than at least the required capability, which is determined by the determination unit, are notified as supported capabilities.

11. The image processing apparatus of claim 1, wherein the notification unit returns the capability notification that at least the required capability, which is determined by the determination unit, are notified as non-supported capabilities.

12. An image processing apparatus comprising:
    a communication interface unit that communicates with a terminal device having a function to transmit print data; and
    a printer controller having one or more capabilities to process the print data,
    the printer controller comprising:
    an acquisition unit that acquires a capability information request transmitted from the terminal device;
    a notification unit that returns a capability notification to the terminal device having transmitted the capability information request to notify a capability which can be handled by the printer controller; and
    a determination unit that determines a capability required by a particular function which is one of a plurality of different functions and set to be disabled,
    wherein, even when the capability determined by the determination unit can be handled by the printer controller, the notification unit does not notify that the determined capability is supported.

13. A control method of controlling an image processing apparatus equipped with one or more functions to process print data, comprising:
    acquiring a capability information request transmitted from a terminal device having a function to transmit the print data;
    determining a capability required by a particular function which is one of a plurality of different functions and set to be disabled; and
    returning a capability notification to the terminal device having transmitted the capability information request to notify a capability which can be handled by the image processing apparatus,
    wherein, even when the determined capability can be handled by the image processing apparatus, the capability notification is returned such that the determined capability is not supported.

14. A non-transitory computer readable recording medium storing a computer program for operating a computer as an image processing apparatus having one or more functions to process print data, and causing the computer to execute:
    acquiring a capability information request transmitted from a terminal device having a function to transmit the print data;
    determining a capability required by a particular function which is one of a plurality of different functions and set to be disabled; and
    returning a capability notification to the terminal device having transmitted the capability information request to notify a capability which can be handled by the image processing apparatus,
    wherein, even when the determined capability can be handled by the image processing apparatus, the capability notification is returned such that the determined capability is not supported.

* * * * *